(12) United States Patent
Al-Roub et al.

(10) Patent No.: US 6,651,439 B2
(45) Date of Patent: Nov. 25, 2003

(54) METHODS AND APPARATUS FOR SUPPLYING AIR TO TURBINE ENGINE COMBUSTORS

(75) Inventors: Marwan Al-Roub, Cincinnati, OH (US); Clifford Stephen Creevy, Loveland, OH (US); Hubert Smith Roberts, Jr., Cincinnati, OH (US); Anthony Paul Greenwood, Kings Mills, OH (US)

(73) Assignee: General Electric Co., Schenectady, NY (US)

( * ) Notice: Subject to any disclaimer, the term of this patent is extended or adjusted under 35 U.S.C. 154(b) by 50 days.

(21) Appl. No.: 09/760,167

(22) Filed: Jan. 12, 2001

(65) Prior Publication Data

US 2002/0092303 A1 Jul. 18, 2002

(51) Int. Cl.[7] .................................................. F01C 1/00
(52) U.S. Cl. ........................................ 60/772; 60/751
(58) Field of Search .................................... 60/751, 772

(56) References Cited

U.S. PATENT DOCUMENTS 2,833,115 A * 5/1958 Clarke et al. ................ 60/751
3,299,632 A * 1/1967 Wilde et al. ................. 60/751
4,576,550 A    3/1986 Bryans
5,335,501 A    8/1994 Taylor
5,592,821 A * 1/1997 Alary et al. ................. 60/751
5,619,855 A * 4/1997 Burrus ........................ 60/751
5,737,915 A    4/1998 Lin et al.
5,970,716 A   10/1999 Forrester et al.

* cited by examiner

Primary Examiner—Michael Koczo
(74) Attorney, Agent, or Firm—William Scott Andes; Armstrong Teasdale LLP; Robert B. Reeser, III

(57) ABSTRACT

A combustor for a gas turbine engine that facilitates reducing combustor chamber dump pressure losses to improve combustor and engine performance is described. The combustor includes a diffuser that diffuses airflow directed into the combustor. The diffuser includes an outer wall, an inner wall, and a plurality of splitter vanes between the outer wall and the inner wall. The splitter vanes are spaced radially apart, and each is spaced radially from a respective diffuser wall such that an outer passage, an inner passage, and a central passage are defined by the splitter vanes.

17 Claims, 3 Drawing Sheets

METHODS AND APPARATUS FOR SUPPLYING AIR TO TURBINE ENGINE COMBUSTORS

BACKGROUND OF THE INVENTION

This application relates generally to gas turbine engines and, more particularly, to combustors for gas turbine engine.

Within known jet engines, air leaves a compressor with a relatively high axial velocity. To facilitate reducing pressure losses while increasing combustion efficiency, the air velocity is reduced as it enters a combustor. More specifically, the combustor includes an inlet section, known as a diffuser, that decelerates the airflow.

To facilitate reducing an effect of diffusion of the airflow on engine specific fuel consumption (SFC), a diffusion process within the combustor should provide a relatively high static pressure recovery of the airflow downstream from the diffuser while simultaneously reducing flow losses. Diffusion is determined by a ratio of an outlet area of the diffuser to an inlet area of the diffuser, a ratio known as an effective area ratio of the diffuser. To achieve a given pressure recovery with relatively low-pressure losses, at least some known diffusers have relatively long lengths measured between the inlet and outlet areas of the diffuser. As the length of the diffuser is increased, a weight of the engine is increased. However, within known diffusers, as the length of the diffuser is reduced, static pressure recovery is reduced.

To facilitate improving the diffusion process, at least some known diffusers include two diffuser channels separated by a circumferentially extending splitter. Because each channel is smaller than an original single channel, to achieve a desired effective area ratio, the two channels have increased heights. Although airflow exiting a single channel is often more uniform than that of airflow exiting two channel diffusers, often the flow from single channels does not spread out enough within the combustor, and the performance of the combustor is adversely affected.

BRIEF SUMMARY OF THE INVENTION

In an exemplary embodiment, a combustor for a gas turbine engine facilitates reducing combustor dump pressure losses to improve combustor and engine performance. The combustor includes a diffuser that diffuses airflow directed into the combustor. The diffuser includes an outer wall, an inner wall, and a plurality of splitter vanes between the outer wall and the inner wall. The splitter vanes are spaced radially apart, and each splitter vane is spaced radially from a respective diffuser wall to define at least three diffuser passages within the diffuser. More specifically, an outer passage, an inner passage, and a central passage are defined by the splitter vanes. The diffuser facilitates a gas turbine engine including a high area ratio and reduced engine length and weight, without sacrificing engine pressure losses or specific fuel consumption, SFC.

In use, the diffuser splitter vanes divide the airflow into the three separate passages which act in parallel. More specifically, the outer passage diffuses and channels the axial airflow radially outward to facilitate reducing dump losses while improving pressure recovery within the combustor, the central passage diffuses the axial airflow and maintains the airflow in an axial direction to facilitate minimizing flow losses, and the inner passage diffuses the airflow and channels the axial airflow radially inward to facilitate reducing dump losses while improving pressure recovery within the combustor. As a result, the diffuser facilitates reducing combustor dump losses to improve combustor performance without sacrificing engine specific fuel consumption, SFC.

DETAILED DESCRIPTION OF THE INVENTION

Figure 1:
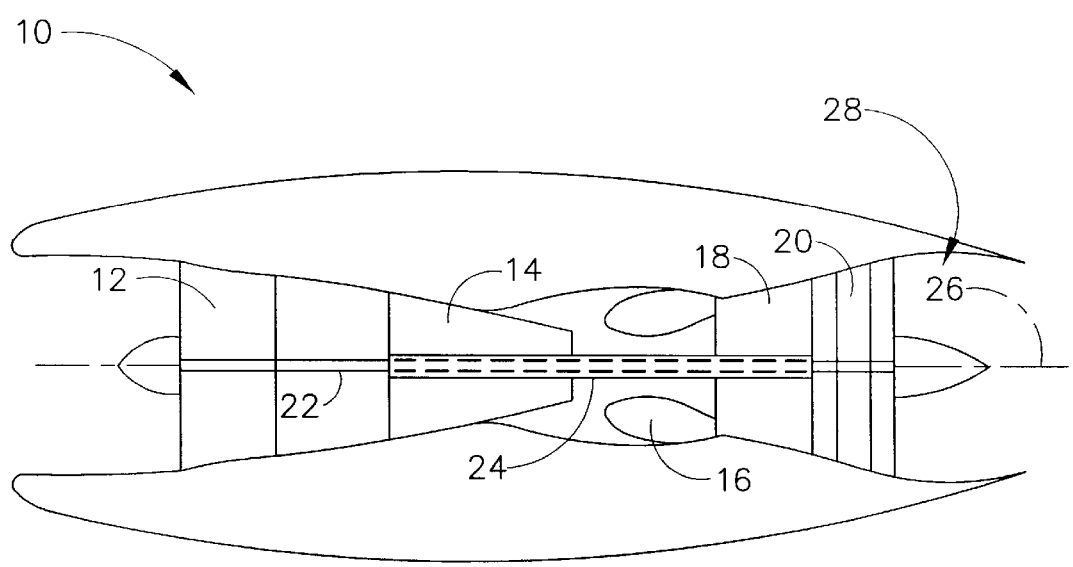
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 24. In one embodiment, gas turbine engine 10 is an LM6000 engine commercially available from General Electric Aircraft Engines, Cincinnati, Ohio. Engine 10 also includes a center longitudinal axis of symmetry 26 extending therethrough.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 28.

Figure 2:
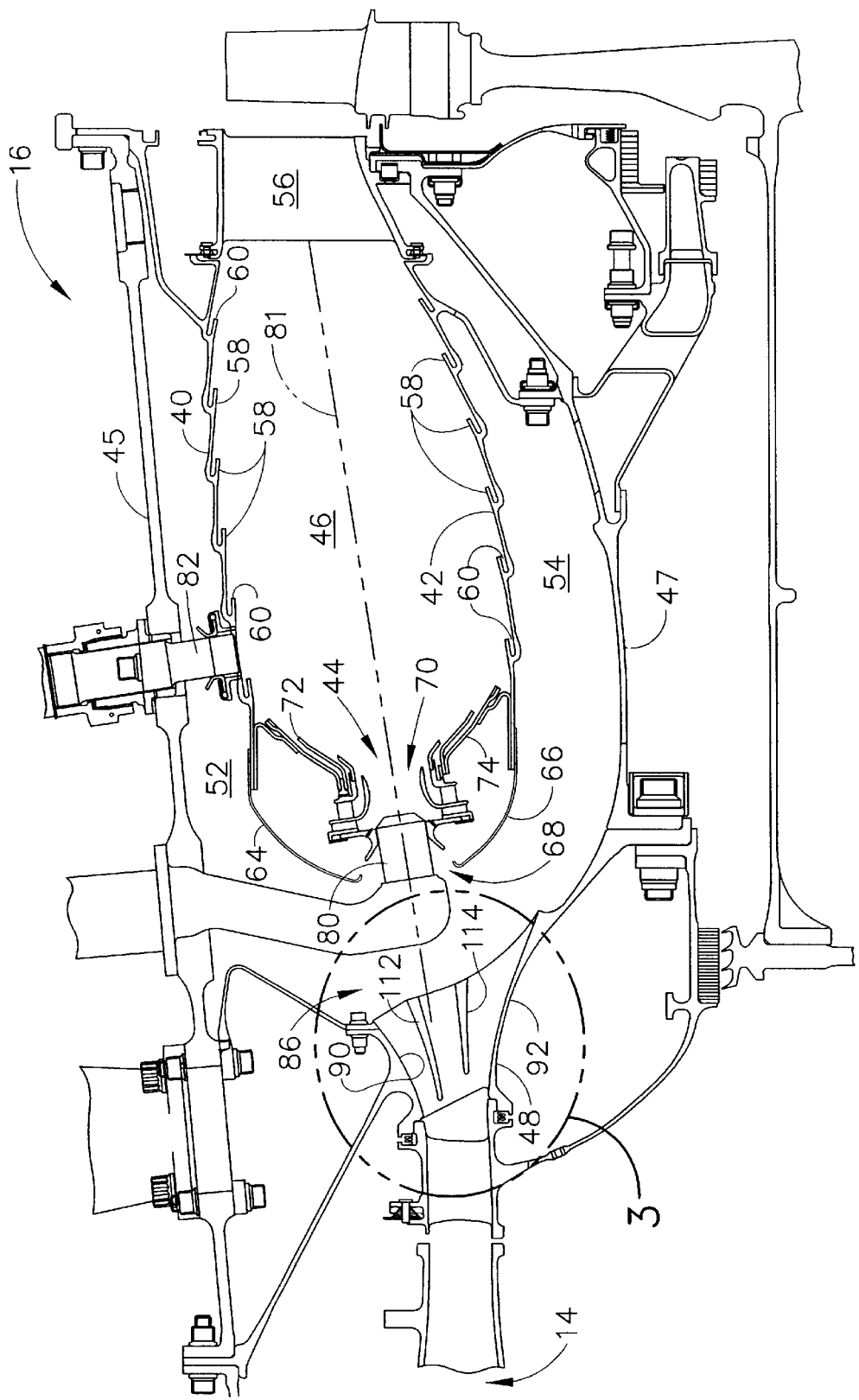
FIG. 2 is a cross-sectional view of a combustor used with the gas turbine engine shown in FIG. 1.
Figure 3:
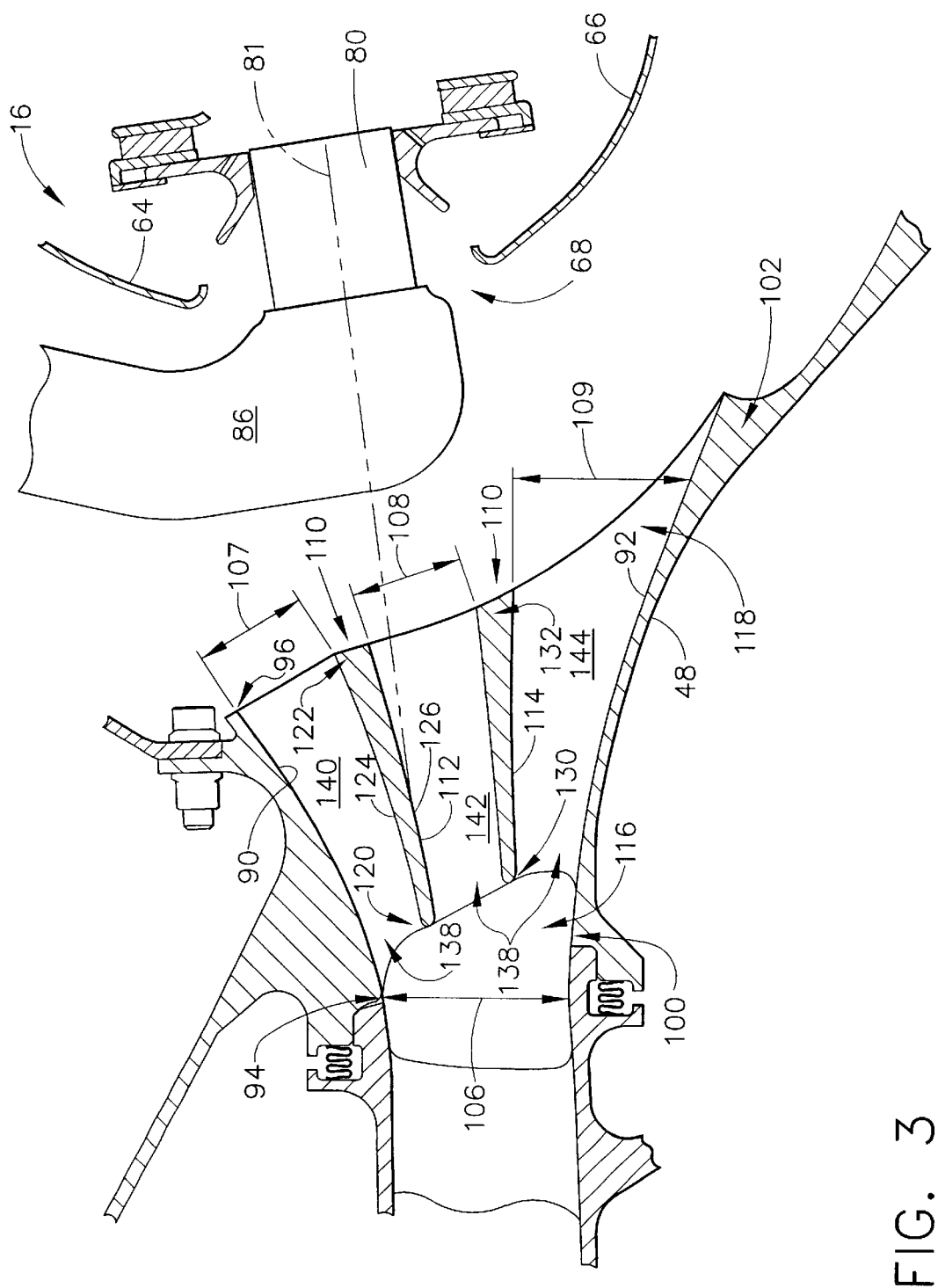
FIG. 3 is an enlarged view of the combustor shown in Figure taken along area 3.

FIG. 2 is a cross-sectional view of combustor 16 used in gas turbine engine 10 (shown in FIG. 1). FIG. 3 is an enlarged view of combustor 16 taken along area 3 shown in FIG. 2. Combustor 16 includes an annular outer liner 40, an annular inner liner 42, and a domed end 44 extending between outer and inner liners 40 and 42, respectively. Outer liner 40 is spaced radially inward from a combustor casing 45 and with inner liner 42 defines a combustion chamber 46.

Combustor casing 45 is generally annular and extends downstream from a diffuser 48. Combustion chamber 46 is generally annular in shape and is disposed between liners 40 and 42. Outer liner 40 and combustor casing 45 define an outer passageway 52, and inner liner 42 and an inner combustor casing 47 define an inner passageway 54. Inner liner 42 is spaced radially outward from inner combustor casing 47. Outer and inner liners 40 and 42 extend to a turbine nozzle 56 disposed downstream from diffuser 48. In the exemplary embodiment, outer and inner liners 40 and 42 each include a plurality of panels 58 which include a series of steps 60, each of which form a distinct portion of combustor liners 40 and 42.

Outer liner 40 and inner liner 42 each include a cowl 64 and 66, respectively. Inner cowl 66 and outer cowl 64 are upstream from panels 58 and define an opening 68. More specifically, outer and inner liner panels 58 are connected serially and extend downstream from cowls 66 and 64, respectively.

In the exemplary embodiment, combustor domed end 44 includes an annular dome 70 arranged in a single annular configuration. In one embodiment, combustor domed end 44 includes a plurality of domes 70 arranged in a double annular configuration. In a second embodiment, combustor domed end 44 includes a plurality of domes 70 arranged in a triple annular configuration. Dome 70 includes an outer end 72 fixedly attached to combustor outer liner 40 and an inner end 74 fixedly attached to combustor inner liner 42.

Combustor 16 is supplied fuel via a fuel nozzle 80 connected to a fuel source (not shown) and extending through combustor casing 45. More specifically, fuel nozzle 80 extends through cowl opening 68 and discharges fuel in a direction (not shown) that is substantially concentric with respect to a combustor center longitudinal axis of symmetry 81. Combustor 16 also receives fuel from a pilot fuel injector (not shown) and includes a fuel igniter 82 that extends through combustor casing 45 downstream from fuel nozzle 80.

A diffuser dump region 86 is upstream from dome 70 and fuel nozzle 80. Diffuser dump region 86 enables the combustor to increase a static pressure of airflow exiting compressor 14, known as combustor pressure recovery. More specifically, diffuser dump region 86 receives compressed airflow from diffuser 48. Diffuser 48 is annular and is disposed coaxially about engine center longitudinal axis of symmetry 26.

Diffuser 48 includes an annular radially outer wall 90 and an annular radially inner wall 92 spaced radially inward from outer wall 90. Outer wall 90 includes a leading edge portion 94 and a trailing edge portion 96. Inner wall 92 includes a leading edge portion 100 and a trailing edge portion 102. Diffuser 48 is divergent such that outer wall trailing edge portion 96 is downstream and radially outward from outer wall leading edge portion 94, and such that inner wall trailing edge portion 102 is downstream and radially inward from inner wall leading edge portion 100. Accordingly, an annulus height 106 of an effective inlet cross-sectional area of diffuser 48 measured with respect to leading edge portions 94 and 100 is smaller than a total height (not shown) of an effective outlet cross-sectional area of diffuser 48 measured with respect to trailing edge portions 96 and 102. More specifically, the total annulus height of the effective outlet cross-sectional area is determined by summing an annulus height 107, 108, and 109 of each respective diffuser passage 140, 142, and 144. In one embodiment, diffuser 48 has a high area ratio. In one embodiment, diffuser 48 includes a plurality of radial struts (not shown) that during operation facilitate low temperature split bleed for improving rotor cooling and durability.

A plurality of splitter vanes 110 are disposed between diffuser inner and outer walls 92 and 90, respectively. In one embodiment, splitter vanes 110 are fabricated from a thin, light-weight material. More specifically, diffuser 48 includes a first splitter vane 112 and a second splitter vane 114, each extending from a leading edge 116 to a trailing edge 118 of diffuser 48. First splitter vane 112 is between second splitter vane 114 and outer wall 90. More specifically, first splitter vane 112 is spaced radially outward from second splitter vane 114 and radially inward from outer wall 90.

First splitter vane 112 is aerodynamically-shaped. In the exemplary embodiment, a leading edge portion 120 of first splitter vane 112 is thinner than a trailing edge portion 122 of first splitter vane 112. Furthermore, in the exemplary embodiment, both a radially outer side 124 and a radially inner side 126 of first splitter vane 112 curve radially outward relative to combustor center longitudinal axis of symmetry 81.

Second splitter vane 114 is aerodynamically-shaped and is between first splitter vane 112 and diffuser inner wall 92. More specifically, second splitter vane 114 is spaced radially inward from first splitter vane 112 and radially outward from diffuser inner wall 92. In the exemplary embodiment, a leading edge portion 130 of second splitter vane 114 is thinner than a trailing edge portion 132 of second splitter vane 114.

Splitter vanes 110 define a plurality of flow passages 138 extending from diffuser leading edge 116 to diffuser trailing edge 118. More specifically, splitter vanes 110 define an outer passage 140, a central passage 142, and an inner passage 144. Outer passage 140 is between outer wall 90 and first splitter vane 112, and channels a portion of airflow entering diffuser 48 slightly radially outward relative to combustor center longitudinal axis of symmetry 81.

Central passage 142 is between outer and inner passages 140 and 144, respectively, and more specifically, is defined between first and second splitter vanes 112 and 114, respectively. Central passage 142 directs a portion of airflow entering diffuser 48 axially outward in a direction (not shown) substantially parallel to combustor center longitudinal axis of symmetry 81.

Inner passage 144 is defined between second splitter vane 114 and diffuser inner wall 92. Inner passage 144 directs a portion of airflow entering diffuser 48 slightly radially inward relative to combustor center longitudinal axis of symmetry 81. In one embodiment, a portion of airflow discharged from diffuser 48 through passages 140, 142, and 144 is directed axially outwardly in a direction that is substantially parallel to engine center longitudinal axis of symmetry 26 (shown in FIG. 1), a portion of airflow discharged is directed radially inwardly with respect to axis of symmetry 26, and a portion of airflow discharged radially inwardly with respect to axis of symmetry 26, and a portion of airflow discharged is directed radially outwardly with respect to axis of symmetry 26.

During operation, air flows through low pressure compressor 12 (shown in FIG. 1) and compressed air is supplied from low pressure compressor 12 to high pressure compressor 14. The highly compressed air is delivered to combustor 16 and enters diffuser 48. Diffuser splitter vanes 110 divide the airflow into three separate diffuser passages 138 acting in parallel. Specifically, airflow entering outer passage 140 is diffused and channeled radially outward prior to being discharged into combustor diffuser dump region 86, airflow entering central passage 142 is diffused and channeled axially into combustor diffuser dump region 86, and airflow entering inner passage 144 is diffused and channeled radially inward prior to being discharged into combustor diffuser dump region 86.

Because airflow is discharged radially outward, axially, and radially inward when exiting diffuser 48, the airflow is more evenly spread across dome 70 and combustion chamber 46 than with axial flow diffusers. As a result, dump losses within combustor diffuser dump region 86 are reduced, and combustor pressure recovery is improved. Furthermore, more efficient pressure recovery within combustion chamber 46 is facilitated without sacrificing engine specific fuel consumption, SFC.

The above-described combustor system for a gas turbine engine is cost-effective and reliable. The combustor system includes a diffuser including a pair of splitter vanes that define three diffuser passages. The outer passage channels airflow radially outward, the central passage discharges airflow axially, and the inner passage channels airflow radially inward. As a result, the diffuser facilitates reducing dump losses within the combustion chamber, and improving combustor performance.

While the invention has been described in terms of various specific embodiments, those skilled in the art will recognize that the invention can be practiced with modification within the spirit and scope of the claims.

What is claimed is:

1. A method for supplying airflow to a gas turbine engine combustor through a diffuser, the combustor including at least one dome, the gas turbine engine having a longitudinal axis of symmetry, the diffuser including a radially outer wall, a radially inner wall, and a plurality of splitter vanes spaced radially between the radially outer wall and radially inner wall, said method comprising the steps of:

directing compressed airflow axially to the combustor diffuser; and channeling the compressed airflow through at least three passages defined by the splitter vanes and extending through the diffuser, wherein a portion of the airflow exiting the diffuser is channeled radially inwardly with respect to the engine centerline through a radially inner passage, and a portion of the airflow is channeled obliquely with respect to the engine centerline through a center passage that is defined between a radially outer passage and the radially inner passage, and channeling the airflow discharged from the at least three passages through a diffuser dump region defined between the combustor dome and the diffuser.

2. A method in accordance with claim 1 wherein said step of channeling the compressed airflow further comprises the steps of:

diffusing the compressed axial airflow; and channeling a portion of the airflow radially outward relative to a center axis of symmetry of the combustor.

3. A method in accordance with claim 2 wherein said step of channeling the compressed airflow further comprises the step of channeling a portion of the airflow radially inward relative to a center axis of symmetry of the combustor.

4. A method in accordance with claim 1 wherein said step of channeling the compressed airflow further comprises the step of discharging a portion of the airflow from the diffuser in a direction that is substantially parallel to a center axis of symmetry of the combustor.

5. A method in accordance with claim 1 wherein said step of directing compressed airflow further comprises the step of diffusing the airflow entering the combustor with the diffuser, wherein the diffuser has a high area ratio in which an outlet area of the diffuser is greater than an inlet area of the diffuser.

6. A gas turbine engine combustor diffuser for diffusing airflow entering the gas turbine engine combustor, said diffuser comprising:

a radially outer wall;

a radially inner wall; and a plurality of splitter vanes between said radially outer and inner walls, adjacent said splitter vanes spaced radially apart from each other and from said radially outer and inner walls, such that at least three passages are defined to extend through said diffuser, a first of said at least three passages configured to discharge airflow radially inwardly with respect to a longitudinal axis extending through the gas turbine engine, a second of said at least three passages configured to discharge airflow radially outwardly with respect to the gas turbine engine centerline axis of symmetry, a third of said passages defined between the first and second passages, and configured to channel air flowing therethrough obliquely through the combustor relative to a longitudinal axis extending through the engine, said plurality of splitter vanes for discharging air into a diffuser dump region defined downstream from said plurality of splitter vanes.

7. A diffuser in accordance with claim 6 wherein said plurality of splitter vanes comprise a radially inner splitter vane and a radially outer splitter vane, said radially inner splitter vane between said radially outer splitter vane and said radially inner wall.

8. A diffuser in accordance with claim 7 wherein said at least three passages comprise a radially outer passage, a central passage, and a radially inner passage, said central passage between said radially outer and inner passages.

9. A diffuser in accordance with claim 8 wherein said radially outer passage configured to channel air flowing therethrough radially outward through the combustor relative to the engine longitudinal axis.

10. A diffuser in accordance with claim 8 wherein said radially inner passage configured to channel air flowing therethrough radially inward through the combustor relative to the engine longitudinal axis.

11. A diffuser in accordance with claim 6 wherein said diffuser has a high area ratio such that an outlet area of the diffuser is greater than an inlet area of the diffuser.

12. A gas turbine engine combustor comprising a diffuser comprising a radially inner wall, a radially outer wall, and a plurality of splitter vanes between said radially inner wall and said radially outer wall defining at least three passages within said diffuser, a first of said passages is configured to discharge airflow radially inwardly with respect to a longitudinal axis extending through the gas turbine engine, a second of said passages is configured to discharge airflow obliquely through the gas turbine engine with respect to the engine longitudinal axis of symmetry, said second passage defined between said first passage and a third passage, said third passage is configured to discharge airflow radially outwardly with respect to the engine longitudinal axis, said plurality of splitter vanes for discharging air into a diffuser dump region defined downstream from said diffuser.

13. A combustor in accordance with claim 12 wherein said diffuser has a high area ratio such that an outlet area of the diffuser is greater than an inlet area of the diffuser.

14. A combustor in accordance with claim 12 wherein said plurality of splitter vanes comprise a radially inner splitter vane and a radially outer splitter vane, said radially outer splitter vane between said radially inner splitter vane and said radially outer wall.

15. A combustor in accordance with claim 14 wherein said plurality of splitter vanes spaced radially apart to define a radially outer passage, a central passage, and a radially inner passage, said central passage between said radially outer and inner passages.

16. A combustor in accordance with claim 15 wherein said combustor diffuser radially outer passage configured to channel air flowing therethrough radially outward relative to the engine longitudinal axis.

17. A combustor in accordance with claim 16 wherein said combustor diffuser radially inner passage configured to channel air flowing therethrough radially inward relative to the engine longitudinal axis.

* * * * *